United States Patent Office 2,996,703
Patented Aug. 15, 1961

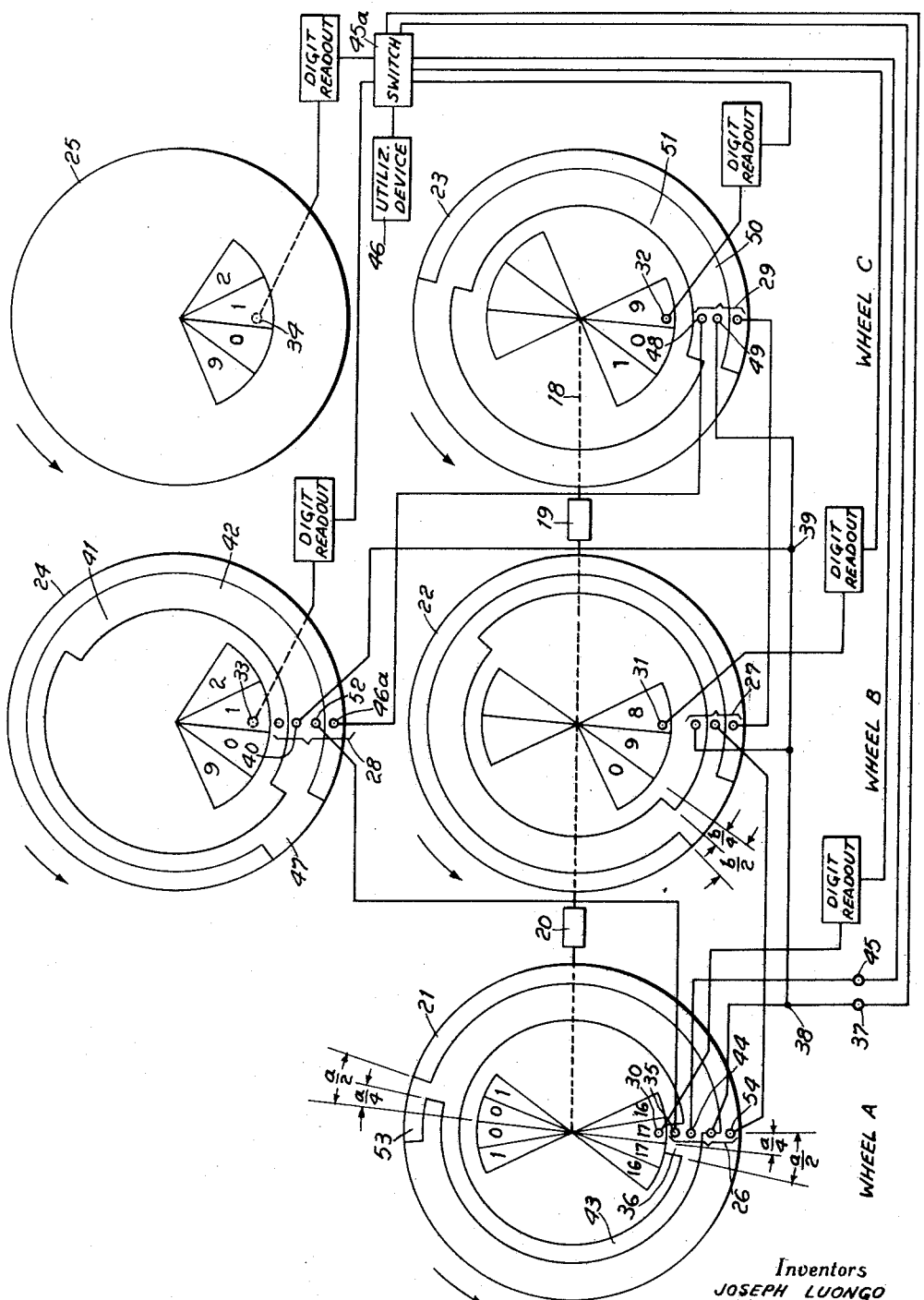

2,996,703
METHOD OF REVERSING COUNT
IN DIGITIZERS
Joseph Luongo, Cedar Grove, N.J., and Dorsey Davidoff, Berkeley, Calif., assignors to International Telephone and Telegraph Corporation, Nutley, N.J., a corporation of Maryland
Filed Jan. 17, 1957, Ser. No. 634,774
6 Claims. (Cl. 340—347)

This invention relates to devices for translating analog information to digital information and in particular to a device which translates shaft rotations into electrical impulses representative of positive and negative values as the shaft rotates in the same direction.

There are numerous occasions in the art of translating analog information to digital information in which a shaft will pass through a reference point and require the translator to count in a descending or negative fashion rather than count in an ascending or positive fashion. For instance, in navigation, an aircraft crossing the 180th meridian while flying from California to Japan would have the instruments in the aircraft continuing to drive in the same direction. As the aircraft approached the 180th meridian the translation readout would be from 178° to 179° to 180° and as it crossed the 180th meridian the translation readout of the shaft position would be descending or negative, that is from 180° to 179° to 178°, etc. One way of accomplishing this type of readout in the past, has been to use digital wheels for the translator device which bear two sets of numbers complementary to each other. A shutter covers one set of numbers and when the navigator recognizes he is in another hemisphere, he merely flips the shutter to get a proper readout. Various other mechanical means have been arranged to use this idea of having two sets of numbers on wheels in order to accomplish the end result of getting first a positive count and then a negative count while driving the shaft in the same direction.

With the advancement of airborne electronic equipment which records automatically a log for flight, it becomes desirable to accomplish the foregoing automatically.

It is, therefore, an object of this invention to provide an improved analog to digital translator.

It is a further object of this invention to provide an analog to digital translator which can readout both positive and negative numbers regardless of the direction of shaft rotation.

It is a further object of the invention to provide an analog to digital translator which applies the burden of controlling the shifting, from a positive or a negative readout value, to the lowest order rotation element.

In a preferred embodiment carrying out the above objects, the invention provides a plurality of code wheels having complementary values on their opposite surfaces back to back. The highest ordered wheel has all its values on the same side, with the positive and negative values each occupying one half of the wheel. As the shaft rotates, and the highest ordered wheel approaches the negative value, either negative zero or the negative high number, the burden of switching to a negative readout is shifted to the next lower ordered wheel and in turn, for the same reason, to finally the lowest ordered wheel. When the lowest ordered wheel passes through the reference zero point, the control function operates and the entire set of wheels are read from the negative side. The terms "positive value" and "negative value" are used throughout the description but could be read "first value" and "second value." The procedure is true in reverse where the translation device is reading in descending order and there is an approach of an ascending order of count.

This last mentioned occasion could be an approach of an aircraft traveling from Germany to the United States as it crosses the zero meridian at Greenwich.

The above-mentioned and other features and objects of this invention will become more apparent by reference to the following description taken in conjunction with the accompanying drawing in which the figure is a combination schematic and circuit representation of an analog-to-digital translation device.

Referring now to the figure, a shaft, identified by the number 18, is adapted to be rotated and the remainder of the mechanism is adapted to produce an electrical pulse output which indicates increasing digital values as the shaft is being rotated in one direction and after a given angle of rotation is reached indicates decreasing digital values as the shaft is continued to be rotated past this position. The shaft is coupled according to different ratios by gear boxes 19 and 20 to three translator wheels 21, 22 and 23. By means of the gear boxes 19 and 20, when wheel C is rotated 10 times there is one complete rotation of wheel B, and when wheel B is rotated 36 times there is one complete rotation of wheel A. The respective back surfaces of the wheels 22 and 23 are shown at 24, 25. On wheel 21 there are shown the control brushes 26. On wheel 22 there are shown the control brushes 27 and on the back surface the control brushes 28. On wheel 23 there are shown the control brushes 29. The readout brushes for the front surfaces of the three wheels are respectively shown at 30, 31 and 32. The readout brushes for the back surfaces are shown respectively at 33 and 34. Although in the figure, the values on the wheels are shown as digital values, it is clear that the values on the wheels could be code values.

In the figure, let us assume that the shaft is part of airborne equipment which is recording the longitudinal positions of a flight of an aircraft which is flying from California to Japan. Let us further assume that the shaft of the device is at a position representing 178.9° longitude. As the aircraft flies toward Japan the shaft rotates as shown by the arrows on the figure and the wheel C will pass over brush 32 to a point where brush 32 will read the zero segment of wheel C. At this same time wheel B will move over brush 31 to a position where brush 31 reads the nine segment. At this time the translator will readout 179.0° longitude. As the flight continues and the shaft continues to rotate, wheel A will approach the point where brush 30 passes from the positive segment 17 to the negative segment 17. Before wheel A reaches this transition point, brush 35 moves on the N sensing segment at 36 and there is continuity to close the "circuit to be controlled" from point 37, 12 o'clock to junction 38, 3 o'clock to junction 39, 12 o'clock to brush 40, locking segment 41, common segment 42, brush 35, N segment 36, common segment 43, brush 44 to the other side of the "circuit to be controlled" at terminal 45. With a closed circuit available the switch 45A passes the readout from brushes 30, 31 and 32 to the device using the information, represented by the utility device 46. It is clear then that as the highest order wheel approaches a point of transition between a positive digital readout and a negative digital readout, the burden of activating the "circuit to be controlled" is shifted from the high order wheel, or wheel A, to the next lower wheel, or wheel B. As wheel B continues to rotate, brush 46A moves on to segment 47 thereby providing a closed parallel control circuit for the "circuit to be controlled" when and if wheel C provides continuity between brushes 48 and 49. When wheel C passes half way through number 5 there is provided continuity between the brushes 48 and 49 and shortly thereafter brush 40, of wheel B, moves off segment 41 such that the circuitry continuity for the circuit to be controlled is a series circuit from point 37 to point 38, to point 39 to brush 49 across segments 50 and 51 through brush 48 back to brush 46A, segment 47, segment 42, brush 52, brush 35, segment 36, segment 43, brush 44 to terminal 45. As wheel C continues to rotate through to the zero point brush 48 leaves the segment 51 and the closed circuit to terminals 37 and 45 is now open. The opening of this circuit shifts the readout from brushes 30, 31, and 32 to brushes 30, 33 and 34. Since the readout circuit is not considered part of the invention and since it can be done by many well-known means it is shown herein as part of the utility device 46. It becomes clear by following the circuitry in accordance with the description above that as the aircraft continues toward Japan, the readout brushes on the back surface to wit: brushes 33 and 34, are activated and that the translation readout from the device will be in a descending fashion. It likewise follows that as wheel A approaches zero, segment 53 will come in contact with brush 54 and the first step toward formulating a closed circuit operative through the control elements on the front surfaces 21, 22 and 23 will be initiated. It is clear that there can be added more than 3 wheels to the device, with all the intermediate wheel being similar to wheel B.

The segments are arranged so that there is a proper overlap in order to insure a good transfer irrespective of shaft rotation. As shown in the figure, the locking segment on wheel A is conductive from the point $$\left(0° + \frac{s}{4}\right) \text{ to } \left(180° - \frac{s}{4}\right)$$

where $s$ is the angle occupied by a segment on wheel A and the N sensing segment and the zero sensing segment are conductive from $$\frac{s}{2}$$

of the positive angle to $$\frac{s}{2}$$

of the negative angle. The same arrangement of the segments are found on wheel B as shown in the figure.

While we have described above the principles of our invention in connection with specific apparatus, it is to be clearly understood that this description is made only by way of example and not as a limitation to the scope of our invention as set forth in the objects thereof and in the accompanying claims.

We claim:

1. A control system for closing a circuit as a shaft is rotated through a predetermined angle comprising a shaft, a plurality of cyclically movable code elements including conduction-controlling segments carried on one surface of each of said movable elements and arranged thereon in accordance with said code to provide different code outputs at different angular positions of said elements, complementary coded conduction-controlling segments carried on the opposite surface of at least one of said movable elements and arranged in accordance with said code to provide code outputs at different angular positions of said movable element complementary to said code outputs produced by said one surface of said one movable element and pick-up means at fixed positions adjacent each of said elements in juxtaposition to said segments for coupling to said segments, means coupling said elements to said shaft to move the first of said elements a smaller angular amount than a second of said elements for the same amount of angular rotation of said shaft, said second element being adapted to be moved through several cyclic movements for each complete cyclic movement of said first element, a circuit to be controlled, a first circuit closing means coupled to said first element which is operative during a given portion of the cyclic movement of said first element, a second circuit closing means operative during a given portion of the cyclic movement of said second element, means coupling said controllable circuit to said first and said second circuit closing means, and means associated with said first element operative as said shaft approaches said predetermined angle for transferring the circuit closing function to said second circuit closing means.

2. A control system for closing a circuit as a shaft is rotated through a predetermined angle comprising a shaft, a plurality of cyclically movable code elements, means coupling said elements to said shaft to move the first of said elements a smaller angular amount than a second of said elements for the same amount of angular rotation of said shaft, said second element being adapted to be moved through several cyclic movements for each complete cyclic movement of said first element, a circuit to be controlled, a first circuit closing means coupled to said first element which is operative during a given portion of the cyclic movement of said first element, a second closing circuit means operative during a given portion of the cyclic movement of said second element, means coupling said controllable circuit to said first and said second circuit closing means, and means coupling said first and said second circuit closing means to each other to shift the priority of the circuit closing function from the higher order valued element to the lower order valued element as said shaft approaches said predetermined angle.

3. A control system for use with a translation device which translates shaft rotations into electrical pulses wherein for every shaft position there is both a first and a second translation value comprising a shaft, a plurality of cyclically movable code elements including conduction-controlling segments carried on one face of each of said movable elements and arranged thereon in accordance with said code to provide different code outputs at different angular positions of said elements, and complementarily coded conduction-controlling segments carried on the opposite face of at least one of said movable elements and arranged in accordance with said code to provide code outputs at different angular positions of said movable element which code outputs are complementary to those on said one face of said one movable element and pickup means at fixed positions adjacent each of said elements opposite said segments for coupling to said segments, means coupling said elements to said shaft for inter-related rotation according to a predetermined ratio, each of said elements assigned a different order of value, a circuit to be controlled, said controllable circuit to shift said translator readout from said first to said second translation value, a plurality of circuit controlling means each of which is associated with a selected surface of each of said elements, each of said circuit controlling means operative for a predetermined angle of rotation of its associated elements, means combining said controllable circuit to each of said circuit controlling means, means coupling each of said circuit controlling means to every other of said circuit controlling means to shift the priority of the control function from the high order valued element to the lowest order valued element.

4. A readout control system for use with a translation device which translates shaft rotations into electrical pulses wherein for every shaft position there is both a positive and negative translation value comprising a plurality of grouped control elements with each group being assigned a different order of value, an input shaft, means coupling said plurality of group elements to said shaft for inter-related rotation according to a predetermined ratio, a plurality of energy flow continuity sensitive devices including conduction-controlling segments and pickup means at fixed positions on said elements, one each of which is associated with one each of said control elements, a circuit to be controlled, said controllable circuit closed by the presence of an energy flow continuity condition to indicate a positive readout, said controllable circuit opened by the absence of said energy flow continuity condition to indicate a negative readout, and circuitry means to couple said continuity sensitive devices in parallel between said circuit to be controlled and said plurality of control elements to cause said continuity condition to be extended from the highest ordered group to the lowest ordered group as a change in sign is sensed whereby said lowest ordered group has the final determination for controlling said circuit to be controlled.

5. A readout control system for use with a translation device which translates shaft rotations into electrical pulses wherein for every shaft position there is both a positive and negative translation value comprising a plurality of digital wheels, each of said digital wheels having control commutating segments coupled thereon, each of said control segments adapted to be conductive for a predetermined angle of its associated digital wheel, a controllable circuit to be opened and closed, a plurality of digit readout means associated with said digital wheels for reading both positive and negative digital information therefrom as said controllable circuit is respectively closed and opened, circuitry means coupling said controllable circuit to said control readout means, and a continuity circuit providing a conduction path for coupling the control means of each digital wheel with the control means of every other digital wheel such that for a predetermined angle of rotation said control segments in conjunction with said control readout means transfer the burden of opening and closing said controllable circuit from the highest valued wheel to the lowest valued wheel.

6. A readout control system according to claim 5, wherein said digital wheels have the values thereon represented in a binary coded form.

References Cited in the file of this patent

UNITED STATES PATENTS

| | | |
|---|---|---|
| 2,620,980 | Brown | Dec. 9, 1952 |
| 2,633,401 | Mitchell | Mar. 31, 1953 |
| 2,661,903 | Goldbach | Dec. 8, 1953 |
| 2,666,912 | Gow et al. | Jan. 19, 1954 |